(12) United States Patent
Tuoriniemi

(10) Patent No.: US 7,707,114 B2
(45) Date of Patent: Apr. 27, 2010

(54) ENABLING MODIFICATION OF CONTROL INFORMATION, WHICH CONTROLS THE RIGHTS TO CONTENT, WHERE ACCESS TO A KEY FOR DECRYPTING THE CONTENT REQUIRES A PARTICULAR VALUE THAT BECOMES MODIFIED WHEN THE CONTROL INFORMATION IS MODIFIED

(75) Inventor: Samuli Tuoriniemi, Oulu (FI)

(73) Assignee: Nokia Corporation, Espoo (FI)

( * ) Notice: Subject to any disclaimer, the term of this patent is extended or adjusted under 35 U.S.C. 154(b) by 201 days.

(21) Appl. No.: 10/558,914

(22) PCT Filed: Jun. 25, 2003

(86) PCT No.: PCT/IB03/02950

§ 371 (c)(1),
(2), (4) Date: Nov. 30, 2005

(87) PCT Pub. No.: WO2004/114099

PCT Pub. Date: Dec. 29, 2004

(65) Prior Publication Data

US 2006/0294018 A1 Dec. 28, 2006

(51) Int. Cl.
G06F 21/22 (2006.01)
H04L 9/16 (2006.01)
(52) U.S. Cl. .......................... 705/57; 380/45
(58) Field of Classification Search .................. 705/57; 380/45
See application file for complete search history.

(56) References Cited

U.S. PATENT DOCUMENTS

2002/0007454 A1  1/2002  Tarpenning et al. ......... 713/156
2003/0056107 A1  3/2003  Cammack et al. ........... 713/189
2005/0021941 A1*  1/2005  Ohmori et al. ............... 713/156
2006/0123025 A1*  6/2006  DeMello et al. ............. 707/100

FOREIGN PATENT DOCUMENTS

WO   WO 01/86396 A2   11/2001

OTHER PUBLICATIONS

Adobe Acrobat 5 PDF for Dummies, photocopy of book, copyright 2002.*

(Continued)

Primary Examiner—Andrew J. Fischer
Assistant Examiner—Christopher C Johns
(74) Attorney, Agent, or Firm—Harrington & Smith

(57) ABSTRACT

A method of modifying a digital rights object including a first portion including a first key and a second portion including first control information for controlling the rights to content encrypted with a second key, the method including the steps of: a) calculating a first function from the first control information of the digital rights object; b) operating on the first key using the first function calculated in step a), to obtain the second key; c) modifying the first control information of the second portion to second control information; d) calculating a second function from the second control information of the digital rights object; and e) operating on the second key obtained in step b) using the second function calculated in step d), to obtain a third key for replacing the first key.

22 Claims, 3 Drawing Sheets

OTHER PUBLICATIONS

"A Stream Cipher Encryption Algorithm 'ARCFOUR'", Internet-Draft, Jul. 14, 1999. Comports with RFC 2026.*

"Introduction to Cryptography with Coding Theory", ISBN 0-130061814-4. Trappe, Wade, and Lawrence Washington. Copyright 2002.*

"PCMHoDC: A Scheme to Protect Copyright & Modification History of Digital Contents", a paper from IFIP TC11 18th International Conference on Information Security (SEC 2003).*

"Rights Expression Language Version 1.0, Version Sep. 13, 2002" by Open Mobile Alliance Ltd., OMA-DownloadDRMREL-v1_0-20020913-C.

* cited by examiner

ENABLING MODIFICATION OF CONTROL INFORMATION, WHICH CONTROLS THE RIGHTS TO CONTENT, WHERE ACCESS TO A KEY FOR DECRYPTING THE CONTENT REQUIRES A PARTICULAR VALUE THAT BECOMES MODIFIED WHEN THE CONTROL INFORMATION IS MODIFIED

FIELD OF THE INVENTION

Embodiments of the invention relate to digital rights management.

BACKGROUND TO THE INVENTION

Digital Rights Management (DRM) has been developed in order to enable the distribution of digital content while controlling the use of that content. The content is encrypted to prevent its unauthorized use and distributed as an encrypted file. The decryption of the content and how it may be used is controlled by a rights object. This rights object may be a separate file or it may be attached to the encrypted content.

The rights object specifies the rights for the content. These rights generally constrain the actions that can be performed on the content. The constraints may, for example, prevent or restrict one or more of using, copying, forwarding, saving, previewing etc. The rights can be limited in time so that the content can only be used for a specified time or they can be limited by play count so that the content can only be used a specified number of times.

A rights object contains a Content Encryption Key (CEK) that is used for decrypting the encrypted content associated with the rights object.

Typically the integrity of the rights object is protected using the digital signature of the content originator. This prevents the modification of the rights object.

Consequently, as the device hosting the rights object cannot update the rights object directly it must have a dedicated database for maintaining rights object information. For example, as the device cannot update the playcount in the rights object each time the content is accessed it must maintain a database that stores and decrements playcount each time the content is accessed.

It would be desirable to enable modification of the rights object while maintaining the integrity of the rights object.

BRIEF SUMMARY OF THE INVENTION

According to one aspect of the present invention there is provided a method of modifying a digital rights object comprising a first portion including a first key and a second portion including first control information for controlling the rights to content encrypted with a second key, the method comprising the steps of:
 a) calculating a first function from the first control information of the digital rights object;
 b) operating on the first key using the first function calculated in step a), to obtain the second key;
 c) modifying the first control information of the second portion to second control information;
 d) calculating a second function from the second control information of the digital rights object; and
 e) operating on the second key obtained in step b) using the second function calculated in step d), to obtain a third key for replacing the first key.

According to another aspect of the present invention there is provided a method of decrypting content under the control of a digital rights object comprising a first portion including a key and a second portion including first control information for controlling the rights to content encrypted with a decryption key, the method comprising the steps of:
 a) calculating a first function from the first control information of the digital rights object;
 b) operating on the key in the second portion of the digital rights object using the first function, contemporaneously calculated in step a), to obtain the decryption key; and
 decrypting the content using the decryption key.

According to another aspect of the present invention there is provided an electronic device comprising:
 a memory for storing a digital rights object comprising a first portion including a first key and a second portion including first control information for controlling the rights to content encrypted with a second key,
 a processor operable:
 to calculate a first function from the first control information of the digital rights object;
 to operate on the first key using the first function to obtain the second key;
 to modify the first control information of the second portion to second control information;
 to calculate a second function from the second control information of the digital rights object; and
 to operate on the second key using the second function to obtain a third key for replacing the first key.

The integrity is maintained as only the trusted device can modify the rights object. A user or hostile agent is prevented from modifying the rights object.

BRIEF DESCRIPTION OF THE DRAWINGS

For a better understanding of the present invention and to understand how the invention can be practised reference will now be made by way of example only to the accompanying drawings of embodiments of the invention in which.

DETAILED DESCRIPTION OF AN EMBODIMENTS OF THE INVENTION

Description

Figure 1:
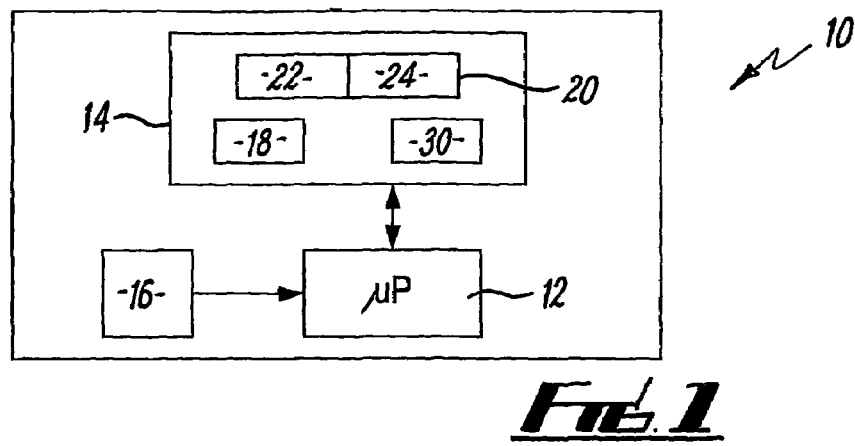
FIG. 1 illustrates a host electronic device that is host to a digital rights object and associated encrypted digital content.

FIG. 1 illustrates a host electronic device 10 that is host to a digital rights object 20 and associated encrypted digital content 30. The rights object 20 has a first portion 22 and a second portion 24. The first portion 22 is a content encryption key CEK for decrypting the encrypted digital content 30 to recover the original digital content. The second portion 24 includes the remainder of the rights object 20 that controls how the content can be used.

The device 10 comprises a processor 12 connected to a memory 14 storing, as separate files, the rights object 20 and the encrypted content 30. The device may also include additional components that are not necessary for the description of the invention and therefore omitted for clarity. The device 10 also has an input 16 connected to the processor through which the device 10 can receive a digital rights object 20 and encrypted content 30 for storage in memory 14. The memory 14 additionally stores a device key 18, which can be used to encrypt information to make it particular to the device 10.

The processor 12 operates under the control of computer program instructions, which may also be stored in memory 14. The computer program instructions enable the processor 12 to carry out the methods described in FIGS. 2 to 4.

The device 10 protects the rights object 20 integrity. It does not use a digital signature, but instead associates the rights object content with the CEK. The CEK and rights object are bound together by encryption. The CEK is encrypted using a key derived from the rights object excluding CEK. The rights object integrity is protected as modifying the rights object will modify that key and prevent correct decryption of CEK. Consequently, the content cannot be decrypted.

The CEK may be in plaintext or it may be encrypted, for example using the device specific key 18. In cases where the CEK is in plain device it may be encrypted when the rights object is received.

Figure 2:
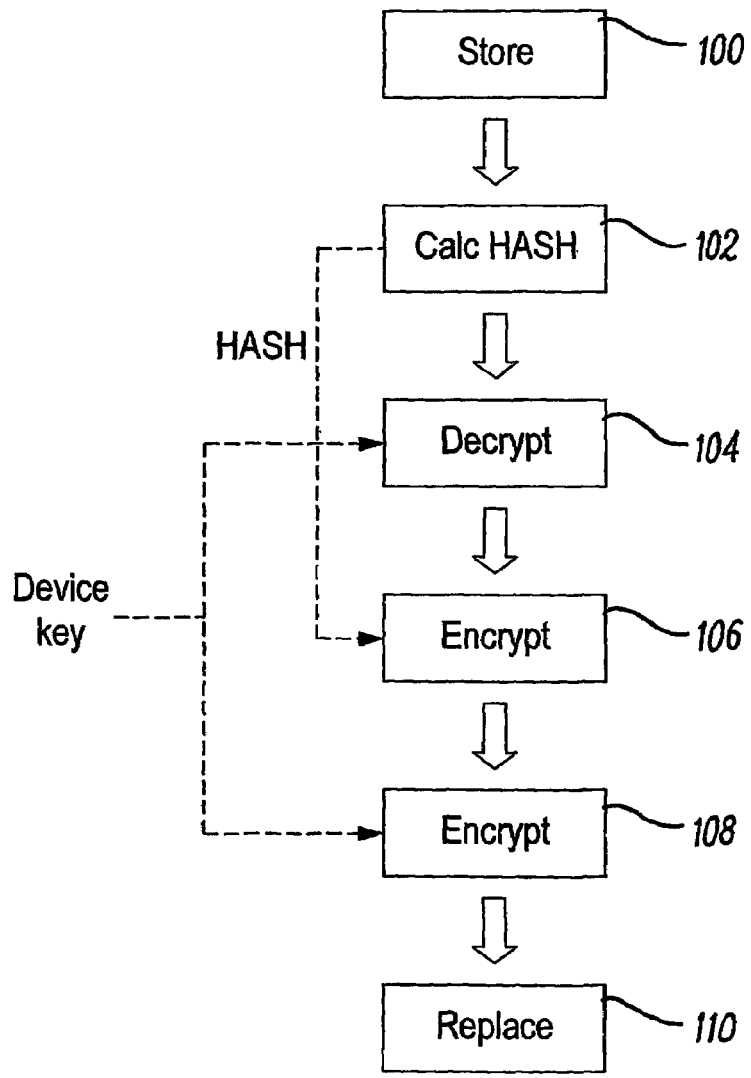
FIG. 2 illustrates the process that occurs in the host device when it first receives a rights object.

FIG. 2 illustrates the process that occurs in the device 10 when it first receives a rights object. In this example, the encrypted content 30 and the rights object 20 are received contemporaneously.

At step 100, the device 10 stores the encrypted content 30 and encrypts the received CEK with its device key to create the device-encrypted content encryption key $CEK_d$. The CEK of the first portion 22 of the rights object 20 is replaced with $CEK_d$ and the rights object 20 is stored in memory 14.

In steps 102 to 110, the device 10 processes the rights object 20 to replace the CEK in the first portion 22 of the rights object 20.

At step 102, the device 10 calculates the HASH of the second portion 24 of the rights object 20. A hash function H is a transformation that takes an input m and returns a fixed-size string, which is called the hash value h (that is, h=H(m)). The HASH will subsequently be used as an encryption key for encrypting the CEK.

At step 104, the $CEK_d$ is decrypted using the device key to recover the original CEK.

At step 106, the original CEK is encrypted with the HASH contemporaneously calculated at step 102. This creates a rights object dependent content encryption key CEK' and binds the content encryption key to the content of the second portion 24 of the rights object 20.

At step 108, CEK' is further encrypted using the device key to create the encrypted, rights object dependent, content encryption key $CEK'_d$.

At step 110, the CEK in the first portion 22 of rights object 20 is replaced by $CEK'_d$ to create an adapted rights object in memory 14.

It should be appreciated that because steps 102 and 104 involve operations on independent portions of the rights object, their order may be reversed.

Figure 3:
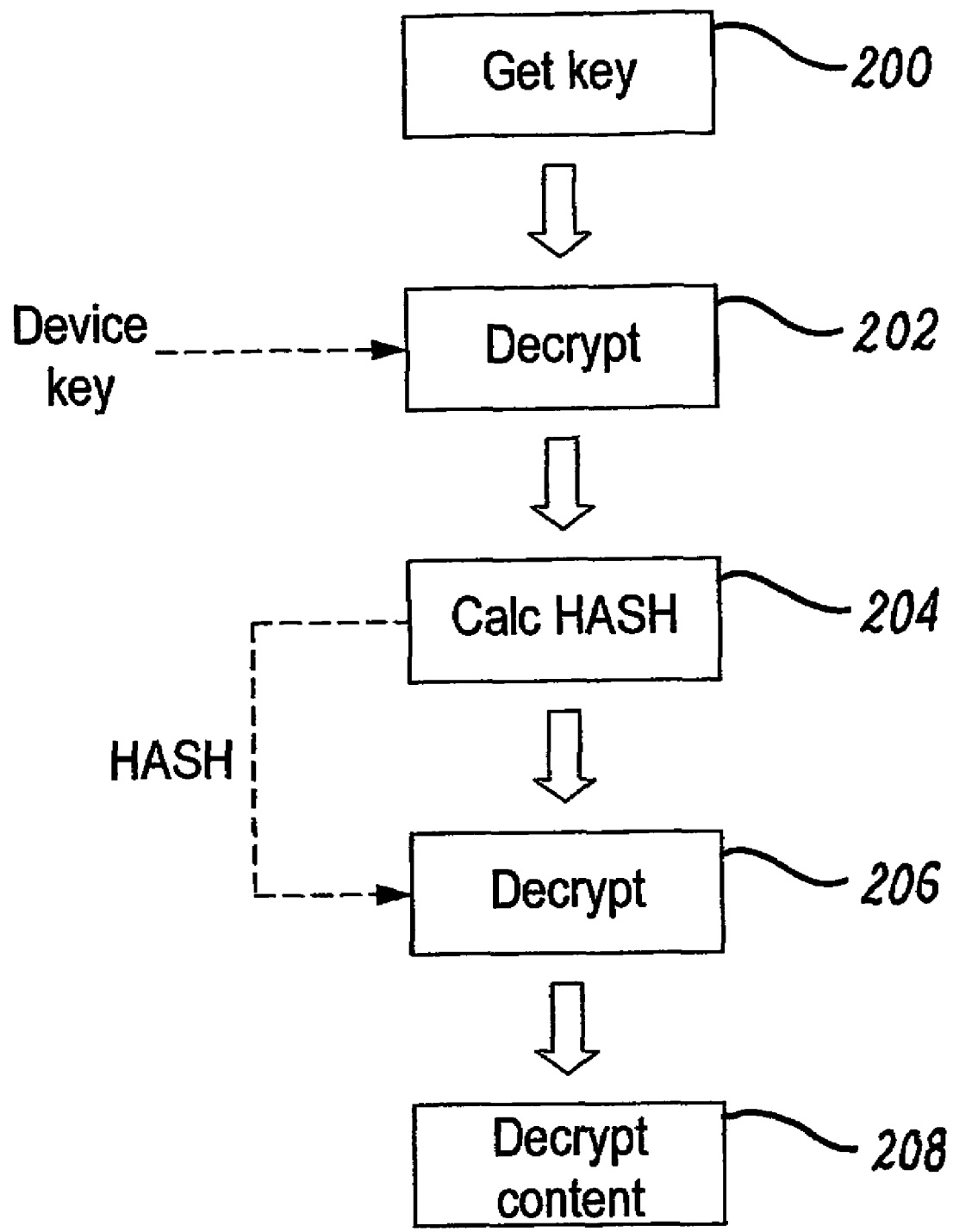
FIG. 3 illustrates the process of decrypting the encrypted content 30.

FIG. 3 illustrates the process of decrypting the encrypted content 30.

At step 200, the device 10 obtains the encrypted, rights object dependent, content encryption key $CEK'_d$ from the first portion 22 of the stored rights object 20.

At step 202, the device 10 recovers the rights object dependent, content encryption key CEK' by decrypting $CEK'_d$ using its device key 18.

At step 204, the HASH for the second portion 22 of the digital rights object 20 is calculated.

At step 206, the original content encryption key CEK is recovered by decrypting CEK' using the HASH contemporaneously determined in step 204.

At step 208, the encrypted content is decrypted using the original content encryption key CEK recovered in step 206.

It should be appreciated that because steps 202 and 204 involve operations on independent portions of the rights object, their order may be reversed.

The rights object prevents the content being stored in the clear. Thus when the content is to be used or accessed it is first decrypted.

If the second portion 22 of the rights object 20 is modified, the HASH calculated at step 204 for recovering the content encryption key CEK will differ from the HASH previously calculated at step 104 and used to encrypt the content encryption key CEK. Consequently, the original content encryption key would not be recovered at step 206 and the decryption of the encrypted content at step 208 would fail.

Figure 4:
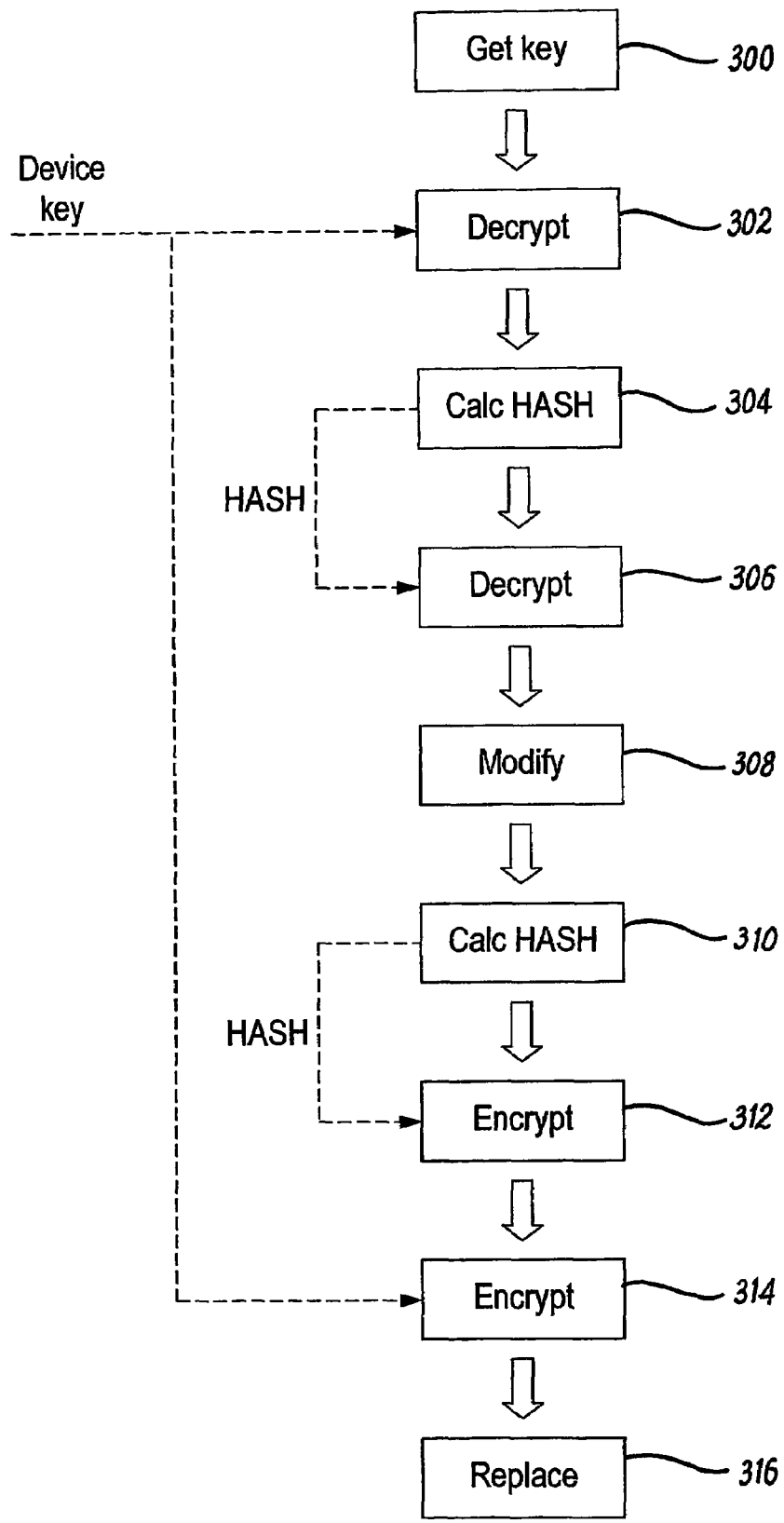
FIG. 4 illustrates the modification of a second portion of the rights object.

However, the device 10 enables the modification of the second portion 22 of the rights object 20 in accordance with the process illustrated in FIG. 4.

At step 300, the device 10 obtains the encrypted, rights object dependent, content encryption key $CEK'_d$ from the first portion 22 of the rights object 20 stored in memory 14.

At step 302, the device 10 recovers the rights object dependent, content encryption key CEK' by decrypting $CEK'_d$ using the device key 18.

At step 304, the HASH for the second portion 22 of the digital rights object 20 is calculated.

At step 306, the original content encryption key CEK is recovered by decrypting CEK' using the HASH contemporaneously determined in step 304.

At step 308, the second portion 22 of the rights object 20 is modified.

At step 310, the HASH for the modified second portion 22 of the rights object 20 is calculated.

At step 312, the original CEK, obtained in step 306, is encrypted with the HASH, calculated in step 310, to form a modified rights object dependent content encryption key CEK". This binds the content encryption key to the modified second portion 22 content of the rights object 20.

At step 314, CEK" is further encrypted using the device key 18 to create the encrypted, modified rights object dependent, content encryption key $CEK''_d$.

At step 316, the $CEK'_d$ in the first portion 22 of the rights object 20 in memory 14 is replaced by $CEK''_d$.

It should be appreciated that because steps 302 and 304 involve operations on independent portions of the rights object, their order may be reversed.

One application for the modification of the rights object is the modification of the playcount in the second portion 22 of the rights object 20. The playcount specifies the number of times an access permission may be granted. It contains a positive integer value N. Access is not allowed to the content more often than that integer value. According to one embodiment of the invention, the integer value N is decremented each time an access permission is granted by modifying the playcount value in the second portion 22 of the rights object. This is one example of the modification of first control information e.g. N to second control information e.g. N−1. Another application for the modification of the rights object is by changing the validity date in the rights object. This date determines when the access rights to the digital content expires. Thus a user may be able to purchase extensions to the validity date. It may also be possible to enable forwarding and copying of the content.

The device 10 is able to save the rights object 20 to a normal memory 14 because the integrity of the rights object 20 is protected. There is also no need to have a dedicated database for maintaining rights object information, as the rights object 20 can be modified to maintain this information itself.

The method may be performed by a computer program that includes executable instructions. The computer program may be stored on a data storage medium or downloaded over the air. It may be used to upgrade an existing mobile telephone so that it can perform the above described method.

Although embodiments of the present invention have been described in the preceding paragraphs with reference to various examples, it should be appreciated that modifications to the examples given can be made without departing from the scope of the invention as claimed.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method comprising
calculating, by a processor, a first value, using a first function, from first control information of a digital rights object wherein the digital rights object comprises a first portion and a second portion, wherein the first portion includes a first key and wherein the second portion includes the first control information which controls the rights to encrypted content wherein the encrypted content is encrypted with a second key;
obtaining, by the processor, the second key by operating on the first key using the first value
creating second control information of the digital rights object by the processor by modifying the first control information of the second portion;
calculating, by the processor, a second value, using a second function, from the second control information of the digital rights object;
obtaining, by the processor, a third key, by operating on the second key using the second value; and
replacing, by the processor, the first key in the first portion with the third key.

2. A method as claimed in claim 1, wherein the first function and the second function are the same.

3. A method as claimed in claim 2, wherein the first function is a HASH function.

4. A method as claimed in claim 1, wherein obtaining the second key by operating on the first key by using the first value comprises decryption of the first key using the first value as a decryption key.

5. A method as claimed in claim 1 wherein obtaining the third key by operating on the second key using the second value comprises encryption of the second key using the second value as an encryption key.

6. A method as claimed in claim 1 wherein modifying the first control information comprises modification of a count value in the second portion of the rights object.

7. A method as claimed in claim 1 further comprising saving the rights object in the clear in a common unsecured memory.

8. A method as claimed in claim 1, comprising receiving the rights object comprising the first key including the second key and comprising a second portion including first control information for controlling the rights to encrypted content wherein the encrypted content is encrypted with the second key, and replacing the second key with the first key in the first portion.

9. A method as claimed in claim 8, further comprising, before the replacement of the second key by the first key:

calculating the first value from the first control information of the digital rights object; and
obtaining the first key by operating on the second key using the first value calculated from the first control information of the digital rights object; and
replacing the second key with the first key.

10. A method as claimed in claim 1, wherein the content is decrypted before modification of the rights object using the second key.

11. A method as claimed in claim 1, wherein the content is decrypted after modification of the rights object by:
calculating the second value from the second control information of the digital rights object;
obtaining the second key by operating on the third key in the second portion of the digital rights object using the calculated second value; and
decrypting the content using the second key.

12. A method as claimed in claim 1, further comprising decrypting the first key using a device key prior to operating on the first key using the first value; and encrypting the third key using the device key.

13. An apparatus comprising:
a processor;
a memory storing computer program instructions that, when executed by the processor, cause the processor:
to calculate a first value, using a first function, from first control information of the digital rights object wherein the digital rights object comprises a first portion and a second portion, wherein the first portion includes a first key and wherein the second portion includes the first control information which controls the rights to encrypted content, wherein the encrypted content is encrypted with a second key;
to obtain the second key by operating on the first key from the first portion using the first value;
to create second control information of the digital rights object, by modifying the first control information of the second portion to second control information;
to calculate a second value, using a second function, from the second control information of the digital rights object;
to obtain a third key by operating on the second key using the second value; and
to replace the first key with the third key.

14. A computer readable medium encoded with a computer program executable to perform actions comprising:
calculating a first value, using a first function, from first control information of a digital rights object wherein the digital rights object comprises a first portion and a second portion, wherein the first portion includes a first key and wherein the second portion includes the first control information which controls the rights to encrypted content wherein the encrypted content is encrypted with a second key;
obtaining the second key by operating on the first key using the first value;
modifying the first control information of the second portion to second control information;
calculating a second value, using a second function, from the second control information of the digital rights object;
obtaining a third key by operating on the second key using the second value; and
replacing the first key with the third key.

15. An apparatus as claimed in claim 13, wherein the first function and the second function are the same.

16. An apparatus as claimed in claim 13, wherein the first function is a HASH function.

17. An apparatus as claimed in claim 13, wherein the computer program instructions cause the processor to decrypt the first key using the first value as a decryption key.

18. An apparatus as claimed in claim 13, wherein the computer program instructions cause the processor to encrypt the second key using the second value as an encryption key.

19. An apparatus as claimed in claim 13, wherein the computer program instructions cause the processor to modify the count value in the second portion of the rights object.

20. An apparatus as claimed in claim 13, wherein the computer program instructions cause the processor to save the rights object in the clear in a common unsecured memory.

21. The method as claimed in claim 1, where modifying the first control information of the second portion comprises at least one of: modifying a playcount specifying a number of times an access permission may be granted, and modifying a validity date specifying when an access permission expires.

22. An apparatus as claimed in claim 13, wherein the computer program instructions cause the processor to modify the first control information of the second portion by modifying at least one of: a playcount specifying a number of times an access permission may be granted, and a validity date specifying when an access permission expires.

* * * * *

UNITED STATES PATENT AND TRADEMARK OFFICE
CERTIFICATE OF CORRECTION

PATENT NO.       : 7,707,114 B2
APPLICATION NO.  : 10/558914
DATED            : April 27, 2010
INVENTOR(S)      : Samuli Tuoriniemi It is certified that error appears in the above-identified patent and that said Letters Patent is hereby corrected as shown below:

Title page, item [54] delete the Title "ENABLING MODIFICATION OF CONTROL INFORMATION, WHICH CONTROLS THE RIGHTS TO CONTENT, WHERE ACCESS TO A KEY FOR DECRYPTING THE CONTENT REQUIRES A PARTICULAR VALUE THAT BECOMES MODIFIED WHEN THE CONTROL INFORMATION IS MODIFIED" and insert -- DIGITAL RIGHTS MANAGEMENT --.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,707,114 B2 | Page 1 of 1 |
| APPLICATION NO. | : 10/558914 | |
| DATED | : April 27, 2010 | |
| INVENTOR(S) | : Samuli Tuoriniemi | |

It is certified that error appears in the above-identified patent and that said Letters Patent is hereby corrected as shown below:

Title page, item [54] and at Column 1, lines 1-7, delete the Title "ENABLING MODIFICATION OF CONTROL INFORMATION, WHICH CONTROLS THE RIGHTS TO CONTENT, WHERE ACCESS TO A KEY FOR DECRYPTING THE CONTENT REQUIRES A PARTICULAR VALUE THAT BECOMES MODIFIED WHEN THE CONTROL INFORMATION IS MODIFIED" and insert -- DIGITAL RIGHTS MANAGEMENT --.

This certificate supersedes the Certificate of Correction issued June 15, 2010.

Signed and Sealed this

Twentieth Day of July, 2010

David J. Kappos
*Director of the United States Patent and Trademark Office*